No. 866,625. PATENTED SEPT. 24, 1907.
R. CONEDERA.
METHOD OF OBTAINING PURE COPPER SULFATE.
APPLICATION FILED FEB. 6, 1906.
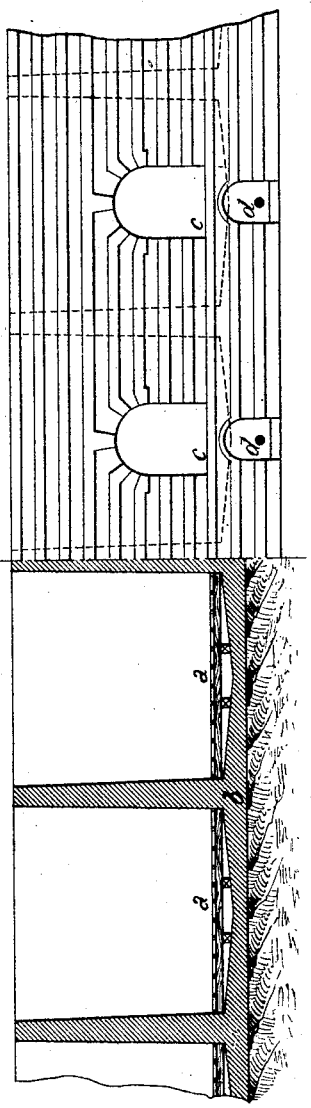
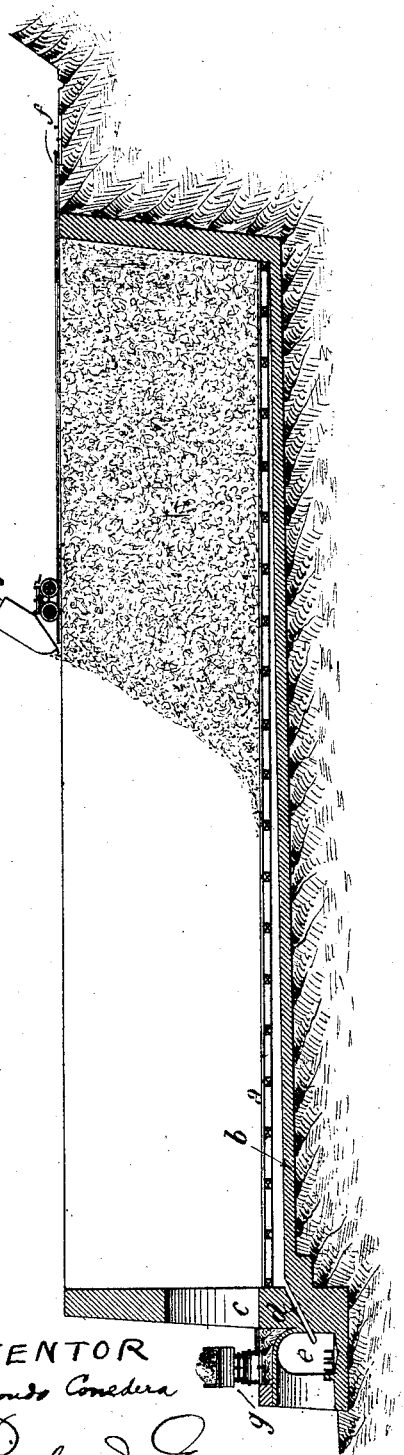
WITNESSES
INVENTOR
Raimondo Conedera

UNITED STATES PATENT OFFICE.

RAIMONDO CONEDERA, OF MASSA MARITTIMA, ITALY.

METHOD OF OBTAINING PURE COPPER SULFATE.

No. 866,625.     Specification of Letters Patent.     Patented Sept. 24, 1907.

Application filed February 6, 1906. Serial No. 299,774.

*To all whom it may concern:*

Be it known that I, RAIMONDO CONEDERA, a subject of Italy, residing at Massa Marittima, Italy, have invented new and useful Improvements in Methods of Obtaining Pure Copper Sulfate, of which the following is a specification.

The present invention relates to the separation of sulfate of copper from mixtures containing sulfate of copper and sulfates of iron in order to obtain sulfate of copper purified from sulfates of iron, directly from roasted copper ores.

The object of the invention is to provide a process at once simple and economical, which may be carried out in an inexpensive manner and without the necessity of those complicated and costly operations which have hitherto been employed for obtaining sulfate of copper.

To this end the invention comprises the process or series of operations which are described as follows and particularly pointed out in the appended claims.

In the accompanying drawings a form of apparatus suitable to the working of the process is represented and described as follows:

Figure 1 is a front and partial sectional elevation. Fig. 2 is a longitudinal section.

In these drawings the letter $a$ indicates a wooden floor with perforations and consequently permeable; $b$ a floor of concrete, impermeable under the former, built on a slightly inclined plane to permit the recovery of solutions which run from the one and convey them by means of the openings $d$ and a small conduit $e$ into the tanks which are not shown in the drawing.

The letter $f$ designates the railway which brings the ore to be worked and $c$ the part used to remove the ore that has been treated and $g$ the railway for carrying away the ore that has been worked.

In my process the roasted copper pyritic ores or roasted copper pyrites instead of being leached which is the ordinary process for recovering copper mixed leachings of sulfate of copper and sulfate of iron are treated in the following fashion in order to obtain by direct process solutions of sulfate of copper without sulfate of iron instead of mixed solutions of the two.

The copper pyritic ores or copper pyrites after having been crushed and roasted according to systems already known, are moistened with a wash saturated with mixed sulfates of iron and copper produced by ordinary leaching or lixiviation of a part of the ores themselves for the purpose of transforming the anhydrous sulfates into hydrated sulfates. After having drained off the liquid in excess they are exposed to the action of the air on a level surface prepared for the purpose as that marked $a$ in the drawings to oxidize and transform the ferrous sulfate or sulfate of protoxid of iron into ferric basic sulfate or sulfate of sesquioxid of iron, insoluble in water.

From what has been said it follows that I employ some processes generally used and known.

1—Crushing and roasting.

2—Leaching of a small part of the roasted copper and iron ores (but not however of the whole quantity to be treated) and that not for the purpose for which these operations have hitherto been employed, that is to say, subjecting the copper to the action of sulfur in order to obtain it in mixed solutions which after that are generally treated by cementation; but for the purpose of purifying the sulfate of copper debased by sulfate of iron in order to get solutions of pure sulfate of copper.

The ore thus prepared forms a porous mass, hydrated and basic in which the ferric sulfate or sulfate of sesquioxid of iron becomes completely insoluble and the ferrous sulfate or sulfate of protoxid of iron as fast as the ore dries, finds itself in contact with the air and is converted into basic ferric sulfate or sulfate of sesquioxid of iron also insoluble in water.

It has been ascertained by experiment that ferric sulfate or sulfate of sesquioxid of iron becomes completely insoluble in less than a week. For the complete oxidation of ferrous sulfate or sulfate of protoxid of iron in order to transform it into basic ferric sulfate or sulfate of sesquioxid of iron, insoluble, it requires from 30 to 90 days according to the quantity of sulfate of iron which was contained in the roasted material. When the oxidation of the ferrous sulfate or sulfate of protoxid of iron and consequently the purification of the sulfate of copper is judged to be complete, a certain quantity of water is thrown on the upper part of the mass of ore, so as to cause a small quantity of the solution to settle to the bottom. An analysis of this solution will show whether or not the sulfate of copper is already purified. If the oxidation of the ferrous sulfate or sulfate of protoxid of iron is not complete, the small quantity of solution which came through the ore will be thrown on it again and this operation will be repeated until the sulfate of copper is completely purified.

When the test solution is totally free from salts of iron the leaching of the ore with water will be undertaken according to the methods usually employed. From the solution of sulfate of copper freed from salts of iron and obtained in the manner described above, sulfate of copper in crystals ready for market can be obtained by ordinary concentration and crystallization. If the residue from leaching the ore thus treated contains copper still it can be utilized in the same way as residue from ordinary leachings, according to systems already known.

The structure upon which hydrated ores containing sulfate of copper to be purified are placed, will be built in compartments as shown in the drawing, so that it may be possible to have under treatment a sufficient quantity of ore to insure regular and uninterrupted work.

From an industrial point of view, the progress which has been attained by my process as compared with processes already known stands out clearly from the fact that by my process sulfate of copper in purified solutions wholly freed from salts of iron and ready to yield direct from roasted copper ores instead of obtaining ordinary leachings of mixed sulfates of copper and iron which are ordinarily utilized by cementation.

Having thus described my invention what I claim is:

An industrial process for purifying sulfate of copper mixed with sulfates of iron in roasted copper pyritic ores, and obtaining directly from the ore solutions of sulfate of copper wholly free from sulfate of iron which consists in first crushing and roasting the ore so that it may contain no undecomposed pyrites then transforming the anhydrous sulfates of iron and copper contained in the roasted ore into hydrated sulfates by means of a liquor saturated with mixed sulfates of copper and iron obtained by an ordinary leach of a part of the same ores, then exposing the porous mass of roasted ore containing the mixed hydrated sulfates thus prepared to the action of the open air to oxidize it and completely transform all the ferrous sulfate into basic, ferric sulfate, insoluble in water, and finally leaching the ore thus purified with water to obtain solutions of sulfate of copper, completely free from salts of iron, substantially as described.

In testimony whereof I have signed my name to this specification in the presence of two subscribing witnesses.

RAIMONDO CONEDERA.

Witnesses:
 EVARISTO HOUDONI,
 SPIRITO BERNARDO.